Patented Apr. 29, 1924.

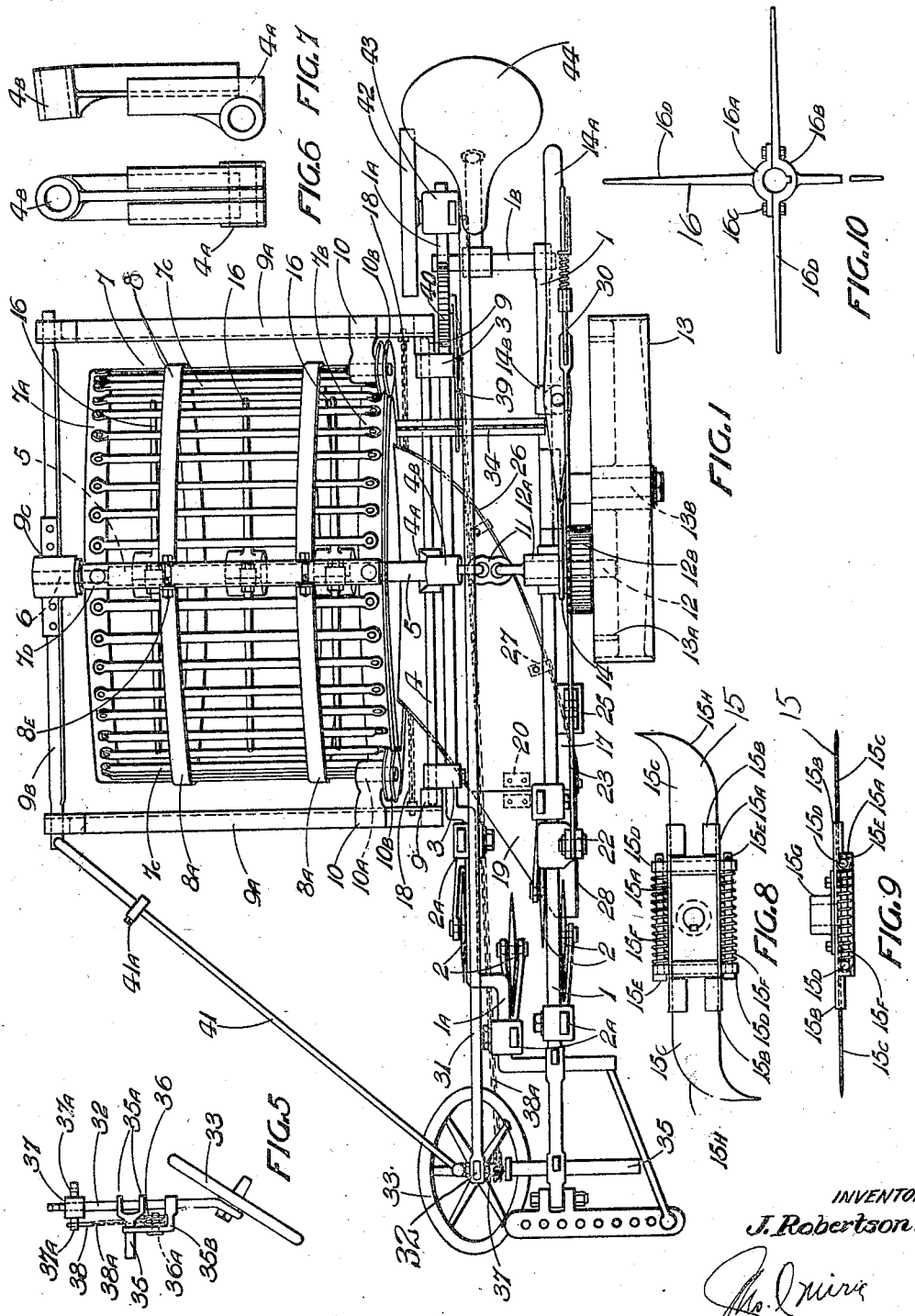

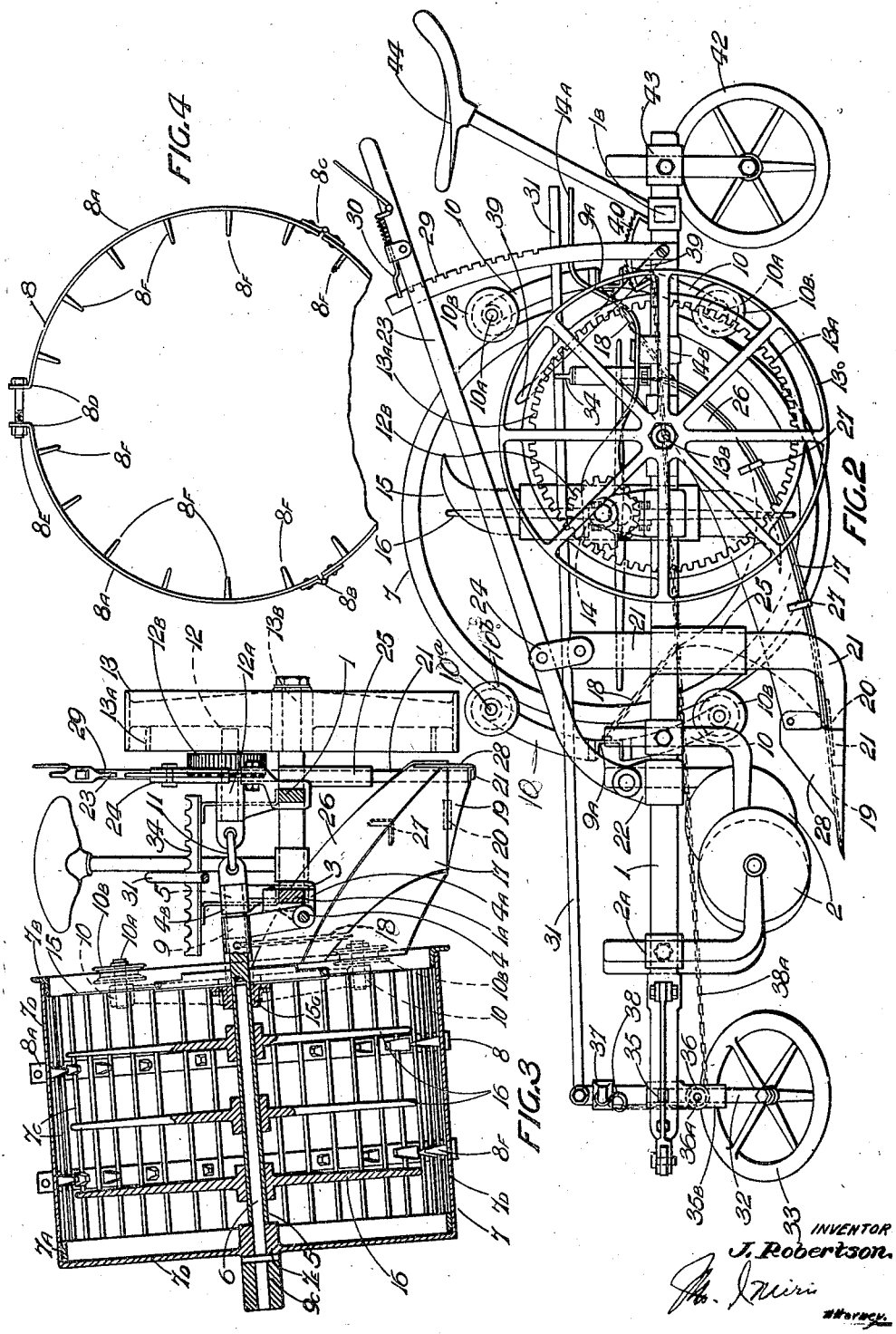

1,492,481

UNITED STATES PATENT OFFICE.

JAMES ROBERTSON, OF DUNEDIN, NEW ZEALAND.

MACHINE FOR ERADICATING WEEDS AND DIGGING POTATOES AND THE LIKE.

Application filed March 31, 1922. Serial No. 548,398.

*To all whom it may concern:*

Be it known that I, JAMES ROBERTSON, a subject of King George V of Great Britain, residing at 40 Dowling Street, Dunedin, in the Dominion of New Zealand, have invented certain new and useful Improvements in a Machine for Eradicating Weeds and Digging Potatoes and the like, of which the following is a specification.

This invention relates to implements used in the tillage of the soil.

The object of my invention is to provide a better combination of known appliances in one agricultural implement.

A further object of the invention is to provide an implement by which the soil may be better disintegrated and weeds and roots more frequently separated from the soil and left exposed on the surface of the ground.

A still further object is to provide means for lifting root crops, such as potatoes or the like, and deposit them on the surface of the ground approximately free from soil.

A suitable design of the invention is illustrated in the drawings accompanying this specification, in which:—

Figure 1 is a plan view of the machine.

Figure 2 is a side elevation of the machine.

Figure 3 is a part end elevation of the machine.

In Figures 2 and 3 certain parts of the machine have been omitted for the sake of clearness.

Figure 4 is a view of one of the toothed bands placed around the screen.

Figure 5 is an end view of the front wheel group.

Figures 8 and 9 are views of a double bracket.

Figures 8 and 9 are views of a double bladed knife.

Figure 10 is a view of one of the disintegrators.

Referring to the numerals on the drawings, the frame of the machine comprises two parallel beams, 1 and 1$^A$, closed at the front end and connected by a stay 1$^B$ at the rear end. There are a number of coulters 2 mounted on the front end of said parallel beams 1 and 1$^A$, through the medium of vertically adjustable coulter brackets 2$^A$. The brackets 3 mounted on parallel beam 1$^A$ support a pivot bar 4; on said pivot bar 4 is mounted a bracket 4$^A$ (Figures 6 and 7) adapted to receive a bracket 4$^B$, which houses a bearing for disintegrator spindle or sleeve shaft 5. These two brackets are fitted for the purpose of taking up any irregular movement between pivot bar 4 and disintegrator spindle 5 which may occur when the machine is moving over rough ground. The said disintegrator spindle 5 is of hollow section for part of its length, and has in its interior a spindle 6 which carries a rotatable screen 7. The screen 7 comprises two rings 7$^A$ and 7$^B$, separated by conveniently pitched circular rods 7$^C$, forming the grid or screen 7, secured to said rings 7$^A$ and 7$^B$. A U shaped member of suitable material 7$^D$, having two arms secured to the rims in alignment with the rods 7$^C$ and the piece uniting the arms crosses the outer end of the screen radially, and is adapted to form a bearing for the screen spindle 6, as at 7$^E$.

Every alternate circular rod 7$^C$ may be bolted to the rings 7$^A$ and 7$^B$ to allow of its easy removal, if desired, when the machine is used for lifting root crops. Around the screen over the said circular rods 7$^C$ may be placed one or more bands 8 comprising a circular strip 8$^A$ of thin material, preferably hinged at two places, 8$^B$ and 8$^C$ of its circumference. The ends 8$^D$ of the circular strip may be made parallel to each other and adapted to receive a bolt 8$^E$ by means of which the band may be fastened tightly around the screen 7. At intervals around the inner diameter of said band 8 are teeth or spikes 8$^F$ which project between rods 7$^C$ into the interior of the screen.

There are brackets 9 mounted at each end of the pivot bar 4 that give support to side frames 9$^A$, the outer end of which supports the end frame 9$^B$ which is adapted, as at 9$^C$, to form a hub for the end of screen spindle 6 before referred to. There are two brackets 10 secured to each of said side frames 9$^A$ which carry spindles 10$^A$ having flanged pulleys 10$^B$ mounted thereon. The flange on rings 7$^B$ of screen 7 is adapted to engage with the grooves on said flanged pulleys 10$^B$ so as to steady the screen 7 when revolving.

The screen spindle 6 is connected by a suitable universal joint 11 with a spindle 12 supported by a suitable bracket 12$^A$ from the beam 1 of the main frame. The pinion 12$^B$ is slidably mounted on said spindle 12 and may be moved in and out of mesh with the internal teeth 13$^A$ on the ground wheel 13 by means of a suitable clutch 14 operated by a clutch lever 14$^A$ pivotally connected to a bracket 14$^B$ mounted on parallel beam 1; the said ground wheel 13 is suitably mounted on axle 13$^B$ secured to parallel beam 1.

Mounted on disintegrator spindle 5, as near the entrance of screen 7 as possible, is a double bladed knife member 15, a detail of which is illustrated in Figures 8 and 9. The mount of the said knife member comprises a length of channel iron 15$^A$ having ends 15$^B$ bent to form slots in which the knives 15$^C$ are housed. Two spindles 15$^D$ are fitted to pass through the flanges of channel iron 15$^A$, and the ends of knives 15$^C$ are bent round the circumference of these spindles. The said spindles 15$^D$ project beyond the flanges of channel iron 15$^A$ and holes are made in each spindle through which a pin 15$^E$ is secured, around which is a coiled spring 15$^F$. A boss 15$^G$ is secured to the channel iron 15$^A$ by means of which the complete knife member 15 is adapted to be suitably mounted on disintegrator spindle 5. The cutting edges 15$^H$ of knives 15$^C$ are rounded, as it has been found that a knife of this form is more efficient than one with straight edges. The peculiar construction of the knife member 15 allows the knives 15$^C$ to partially telescope in their housing against the influence of the coiled springs 15$^F$, if any obstruction or hard matter find its way into the screen 6.

One or more disintegrators 16 may be mounted on the spindle 5, the construction of which is shown plainly in Figure 10. It will be seen that they comprise two semi-circular bossed portions 16$^A$ and 16$^B$ adapted to be secured to each other as at 16$^C$. One of the said bossed portions is provided with an extension or tine 16$^D$, and the other portion with three extensions or tines 16$^D$.

A mould board 17 is supported by chains 18 secured to side frames 9$^A$, and a flexible joint is made between said mould board 17 and the sock 19 of the plough share by means of hinge 20. Said sock 19 is fitted tightly over the toe piece 21, and may be raised or lowered as desired by means of brackets 22 secured to the parallel beam 1, which form a fulcrum for the lever 23 connected by link 24 to an extension of the toe piece, its vertical movement being guided by the brackets 25 also secured to the parallel beam 1. A tail piece 26 is flexibly secured to the mould board 17 by means of right angled clamps 27 fastened to the mould board, but permitting the tail piece 26 to move vertically. There is a vertical plate 28 pivoted at the bottom end of tail piece 26, the said plate being secured at its lower edge to the sock 19. Adjustable means are provided for the purpose of regulating the depth of furrow. There are locking means comprising a rack member 29 suitably supported from the beam 1, and a spring influenced trigger 30 provided to retain the plough share at a desired depth.

The steering of the machine is accomplished by means of a steering rod 31, suitably secured to a front wheel crank 32, upon which the front wheel 33 is mounted, preferably at an angle as shown in Figure 5. A section of T iron 34 suitably supported from the beam 1, is provided with a number of semi-circular slots, and the steering rod 31 is placed in one of these slots, according to the direction in which it is desired to steer the machine. A front axle 35 is adjustably secured to the front of the beam 1, terminating with a forked piece 35$^A$ adapted to form a housing for the front wheel crank 32 before referred to. The upper end of the said crank 32 is adapted to receive the front end of the steering rod 31. A right angled bracket 35$^B$ is attached to the front axle 35, and front wheel crank 32, and a pulley 36 is mounted on a short spindle 36$^A$ housed in said right angle bracket 35$^B$. A bracket 37, having lugs 37$^A$, is mounted near the top of front wheel crank 32, one lug being adapted to receive a hook 38 attached to the end of a chain 38$^A$ which has contact with pulley 36 before passing to the rear of the machine, where it is connected to a lever 39 pivoted to beam 1$^A$, and adapted to operate with a rack quadrant 40, also secured to beam 1$^A$.

By referring to Figure 5, it will be seen that if the lever 39 be moved in a backward direction, the resulting force will be transmitted by the chain 38$^A$ and will cause the front axle 35, and consequently the front of the machine, to slide up the front wheel crank 32, while the front wheel 33 remains in contact with the ground.

There is a stay bar 41 secured at one end to lug 37$^A$ of bracket 37 and secured at the other end of end frame 9$^B$. Said stay bar 41 may be telescopic and have means provided as at 41$^A$ for adjustment. A rear ground wheel 42 is supported by a vertically adjustable bracket 43, secured to the rear end of parallel beam 1$^A$. A seat 44 is provided and suitably supported in a position handy to the various control levers. Tractor means are fixed to the front of the framework whereby a pulley, swingle tree and the usual accessories may be attached for yoking up horses, or the draught may be by motor.

Operation: When operating in a paddock overgrown with twitch, sorrel, yarrow or other noxious weeds, the machine is set to dig a desired depth by means of lever 23. The coulters 2, being disposed in the manner illustrated, cut the turf into strips in advance of the furrow making by the sock 19, and as the machine progresses, the strip cut furrow is projected by means of the mould board 12 into the rolling screen 7, where it is cross cut by revolving knives 15$^A$ of knife member 15, and then pulverized by the rotating tines of the disintegrators 16. The soil is finally sieved through the rolling screen to the ground while the twitch and other weeds, separated from the soil, pass through the screen, and are deposited therefrom on the surface of the ground.

It should be noted that by reason of the knife member 15 and disintegrators 16 being mounted on spindle 5, and the big gear ratio between the pinion 12 and teeth 13^A of ground wheel 13, the said knife member and disintegrators revolve at a much greater speed than the said ground wheel. It should also be noted that no mechanical power is absorbed in revolving the screen 7.

The circular bands or tread carriers 8 are provided partly to give strength to the screen and to aid in the efficient distribution of soil inside the screen, should any of the soil remain in the bottom of the screen, the teeth 8^F on said carrier bands distributing the soil and assisting in breaking it up.

When the machine is used for lifting root crops, such as potatoes and the like, the ploughshare is set sufficiently deep to lift the crop and deliver it with its surrounding soil into the screen 7, where the potatoes or other root crops are separated from the soil and deposited on the surface of the ground in rows.

It is obvious that when the machine is used for the purpose of lifting root crops, the coulters 2, the knife member 15, the circular bands 8, and the disintegrators 16, are removed to prevent damage to the crops. Also when used for this purpose every alternate circular rod 7^C may be removed from the screen, allowing a greater space between the rods. In all other respects the operation of the machine is similar to that already described for the eradication of weeds.

What I claim as new and desire to secure by Letters Patent is:—

1. An agricultural machine, comprising a main frame mounted upon ground wheels, a laterally disposed sleeve shaft, the said shaft forming a bearing for a freely swinging rotatable screen, the swinging being around a pivot supported on the main frame, for the purpose described.

2. An agricultural machine, as claimed in claim 1, the said swinging rotatable screen being characterized by its adaptability to roll without a propelling factor along the ground surface, for the purpose described.

3. An agricultural implement as claimed in claim 1, the said rotatable screen comprising a flat band and a band of angle iron, the two bands being joined by bars to form a cylindrical grid and a U shaped member bridging the outer band to form a hub, a shaft projecting therefrom, and sleeve shaft with rotatable means to engage therewith.

4. In an agricultural implement as claimed in claim 3, toothed carriers comprising a band to surround the screen over the rods, and having teeth projecting to the interior of the screen between one or more pairs of the rods, for the purpose described.

5. An agricultural implement as claimed in claim 4, knives mounted on the sleeve shaft to rotate therewith, and means whereby the said knives partially telescope into their mounts, for the purpose described.

6. An agricultural implement as claimed in claim 5, disintegrators mounted on the sleeve shaft and rotatable therewith, for the purpose described.

7. In an agricultural machine as claimed in claim 1, the combination of a mould board adjustably supported in a manner to direct weeds, root crops, and soil to the interior of the screen at right angles to the line of draught.

8. In agricultural machines as claimed in claim 7, the said mould board terminating at its ground end in a detachable pivotally connected sock, and having means to regulate the digging depth.

9. An agricultural machine, comprising a plow, a screen supported for free rotative and free swinging movement with respect to the plow, and a mould board formed to direct material from the plow into the screen.

10. An agricultural machine, comprising a plow, a screen supported for free rotative and free swinging movement with respect to the plow, a mould board formed to direct material from the plow into the screen, and means arranged in the screen for acting upon said material.

11. An agricultural machine, comprising a plow, a screen supported for free rotative and free swinging movement with respect to the plow, a mould board formed to direct material from the plow into the screen, and means arranged in the screen for acting upon said material, said means being positively driven.

In witness whereof I affix my signature.

JAMES ROBERTSON.

Witnesses:
 ROBERT WAND,
 ROBERT PARK, Jr.